Jan. 11, 1944.   B. C. FLESSNER   2,338,753
IMPLEMENT FOR REMOVING SELF-SEALING JAR COVERS
Filed Aug. 26, 1942

Inventor
Bertha C. Flessner
by Orwig & Hague
Attys

Patented Jan. 11, 1944

2,338,753

UNITED STATES PATENT OFFICE 2,338,753

IMPLEMENT FOR REMOVING SELF-SEALING JAR COVERS

Bertha C. Flessner, Des Moines, Iowa, assignor to Lucile Smith, Des Moines, Iowa Application August 26, 1942, Serial No. 456,184

1 Claim. (Cl. 81—3.46)

At the present there are in general use for the preservation of foods, so-called Mason jars and so-called self-sealing covers therefor. These covers are made of thin stiff metal and are formed with an annular groove on their under surfaces, in which groove is fixed a rubber gasket. They are held in sealed position on the jar by suction caused by a partial vacuum within the jar. The manufacturers of these covers issue instructions for their removal, which instructions state, in substance, that the cover should be punctured to admit air and thereby destroy the vacuum, thus permitting easy removal of the cover. This, of course, destroys the cover, and since the cover is made of steel and rubber, it is, under present conditions, desirable to save these materials.

The object of my invention is to provide an implement made of wood, and of simple, durable and inexpensive construction, whereby an operator may quickly and easily remove said covers without puncturing them or deforming them so that they may be repeatedly re-used, thereby effecting a substantial economy in the art of household food preserving.

Furthermore, there is in general use screw cap covers for Mason jars, and, as is well known, many of these screw caps can not be removed by hand by the average operator. It is the general custom in such cases to break the partial vacuum within the jar by inserting a knife or other implement between the lower edge of the screw cap and bend it upwardly, after which the cap can be easily unscrewed. This proceeding, however, deforms the screw cap and thereby effects a substantial loss.

A further object is to combine with my improved self-sealing cover remover, a means for unscrewing screw caps without deforming them and which may be applied to my implement without appreciable additional expense of manufacture.

The Mason jar is indicated by the numeral 10.

The self-sealing cover has a flat central portion 11 and is made of relatively stiff metal. On its under surface there is formed an annular groove 12 into which there is placed a rubber gasket 13. The periphery of the cover is curved downwardly and inwardly, as shown at 14 in Figure 4.

Figure 3:
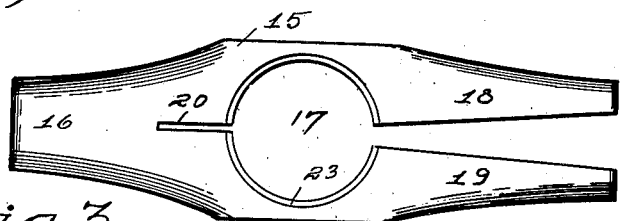
Figure 3 shows a top view of same.

My improved cover removing implement is formed of a single piece of wood or other material having similar characteristics, and comprises a central body portion 15, with an outwardly extended handle 16 at one side. At the center of the body portion there is formed an annular opening 17 of a diameter somewhat less than the diameter of the self-sealing cover. At the side of the body portion 15 opposite from the handle 16, there is a two part handle 18 and 19 formed by cutting away the material between the parts 18 and 19 to the central opening 17, as shown in Figure 3, and on the side of the opening 17 opposite the handle members 18 and 19 there is a slot 20.

Adjacent one flat side of the implement there is formed an annular groove 21. The outer circumference of the groove is shaped to fit the periphery of a self-sealing cover and is inclined or curved inwardly to form an annular rib or shoulder 22 which extends under the edge 14 of a self-sealing cover, as shown in Figure 4.

Figures 4, 5:
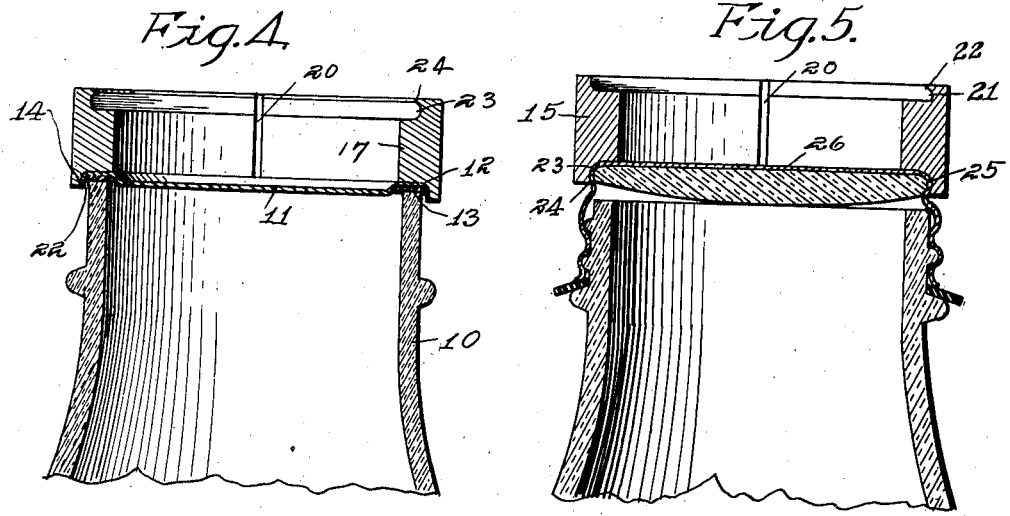
Figure 4 shows an enlarged sectional view of a portion of a Mason jar, a self-sealing cover thereon, and my improved cover removing implement in position for gripping the cover.
Figure 5 shows a vertical sectional view of a part of a Mason jar, a screw cap thereon, and my implement in position for gripping the screw cap for unscrewing it.

On the opposite flat side of the implement there is formed an annular groove 23 having an inwardly inclined or curved portion 24 to receive and substantially fit the upper annular portion 25 of a screw cap 26, as shown in Figure 5. These screw caps in general use have at their upper portions an annular outwardly curved portion 24, and the screw thread 25 starts between this annular curved portion.

Figure 1:
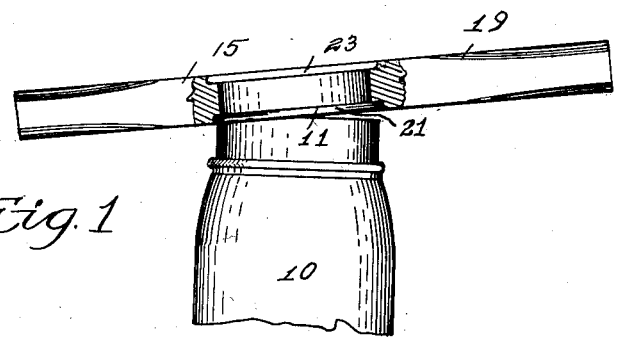
Figure 1 shows a side elevation of a part of a Mason jar and my cover removing implement applied to the self-sealing cover, which is shown in partially removed position, a part of the implement being broken away.
Figure 2:
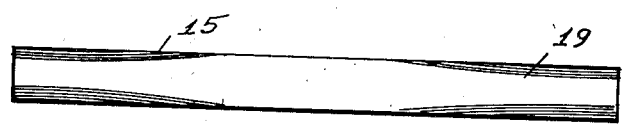
Figure 2 shows an edge view of my improved implement.

In practice, and assuming that it is desired to remove a self-sealing cover firmly sealed to a jar by a partial vacuum within the jar, the operator places the implement around the cover, as shown in Fig. 4. This may be easily done because when the implement is in its normal position, as shown in Fig. 3, the groove 21 is large enough to freely receive the cover so that the bottom of the groove 21 rests on the peripheral rim of the cover with the shoulder 22 below the cover rim portion 14. The operator then squeezes or pulls the handle members 18 and 19 toward each other with one hand until the cover is firmly gripped within the groove or recess 21 and the inwardly extended member 22 enters below the edge 14 of the cover. Then the operator grasps the handle 16 with the other hand and concurrently presses downwardly on one handle while pulling upwardly on the other handle to accomplish a double leverage action for removing the cover and at the same time holding the jar in its upright position. In this manner I have demonstrated that covers of the class which adhere to the jar most firmly may be easily tilted, as shown in Figure 1, and the operator can, while doing this, hold the jar against tilting. When the cover is removed from the jar the handles 18 and 19 are released and spring apart, due to the resiliency of the wood, and permit the cover to drop out. The slot 20 permits added movement of the handle members 18 and 19 toward and from each other. When it is desired to loosen a screw cap the implement is placed on the upper portion of the cap in the same manner with the upper portion 25 of the cap in the groove 23. Then the handle members 18 and 19 are squeezed toward each other, the cap firmly gripped, and due to the leverage of the handles the cap may be unscrewed. In extreme cases one operator may hold the jar against rotary movement and the other operator may use the levers at both ends to loosen the cap.

I claim as my invention:

A device for removing a self-sealing cover from the top of a jar, with said cover being of a substantially flat shape having a peripheral rim extended laterally beyond the top of the jar, said device comprising a body member formed of a single piece of material having a solid handle portion at one end and a split handle portion at an opposite end, with the central portion of said body member having a substantially circular opening therein of a diameter somewhat less than the diameter of said cover, and the split in said split handle portion terminating at said opening, with the wall of said opening having an annular recess formed at one end of said opening, said recess having a normal diameter greater than said cover and being of a contour to receive said cover therein, with the wall of said recess having an inwardly extended annular shoulder portion adjacent the top of said recess, said opening being of a size to provide for the initial positioning of the jar cover within said recess with said shoulder portion below the peripheral rim of said cover and with the bottom of said recess resting on the top of said peripheral rim, with a manual closing of said split handle portion gripping said cover within said recess between the bottom of said recess and said shoulder portion so that on raising of one of said handle portions concurrently with the pressing downwardly on the other of said handle portions one side of said cover is lifted concurrently with the stabilizing of the jar on a supporting surface therefor.

BERTHA C. FLESSNER.